Feb. 28, 1950 D. D. GRIEG 2,498,677

COMMUNICATION OF INTELLIGENCE

Filed June 19, 1945 2 Sheets-Sheet 1

INVENTOR.
DONALD D. GRIEG
BY Percy P. Lantzy
ATTORNEY

COMMUNICATION OF INTELLIGENCE

Filed June 19, 1945 2 Sheets-Sheet 2

INVENTOR.
DONALD D. GRIEG

BY Percy P. Lantzy

ATTORNEY

UNITED STATES PATENT OFFICE 2,498,677

COMMUNICATION OF INTELLIGENCE

Donald D. Grieg, Forest Hills, N. Y., assignor to Federal Telephone and Radio Corporation, New York, N. Y., a corporation of Delaware Application June 19, 1945, Serial No. 600,255

9 Claims. (Cl. 332—15)

This invention relates to new and useful improvements in systems of communicating intelligence.

Intelligence may be communicated to a distance over a suitable medium by modulating the amplitude or the frequency of a carrier in accordance with the desired signal. Each of these systems has its distinct advantages and disadvantages, among which are the following:

The so-called amplitude modulation system (A. M.) occupies considerably less frequency band width than required for frequency modulation (F. M.). On the other hand, the F. M. signal-to-noise ratio may be many times greater. Also the amplifiers in relays and receivers of F. M. are relatively simple since they need not have the straight line response characteristic required for A. M.

The object of the invention is to devise a system of transmitting signals embodying many of the advantages of both amplitude and frequency modulation, and avoiding several of the disadvantages of both systems.

According to the present invention, the intelligence is transmitted by modulating partly the frequency and partly the amplitude of a carrier in accordance with the signal.

This is accomplished by first modulating the amplitude of the carrier in accordance with the signal and then removing the amplitude variations, e. g., by clipping the amplitude modulations. This will yield square waves whose slopes vary in accordance with the modulation. The higher harmonics at the carrier frequency are removed and the frequencies about the carrier fundamental transmitted, e. g., by passing the square waves through a band pass filter which will remove the carrier harmonics and accompanying harmonic sidebands and transmit only the carrier with its accompanying sideband components.

The resultant which might be called a clip modulated (C. M.) carrier, may be received e. g., by first clipping and then differentiating to reproduce the original A. M. signal.

The band width needed for C. M. is somewhat larger than that required for A. M. with a corresponding improvement in signal-to-noise ratio. The amplifiers need not have straight line response curves faithfully to repeat and relay this type of C. M. signals.

The invention will now be more fully explained with reference to the drawings in which.

Figures 1, 2, 3, 4:
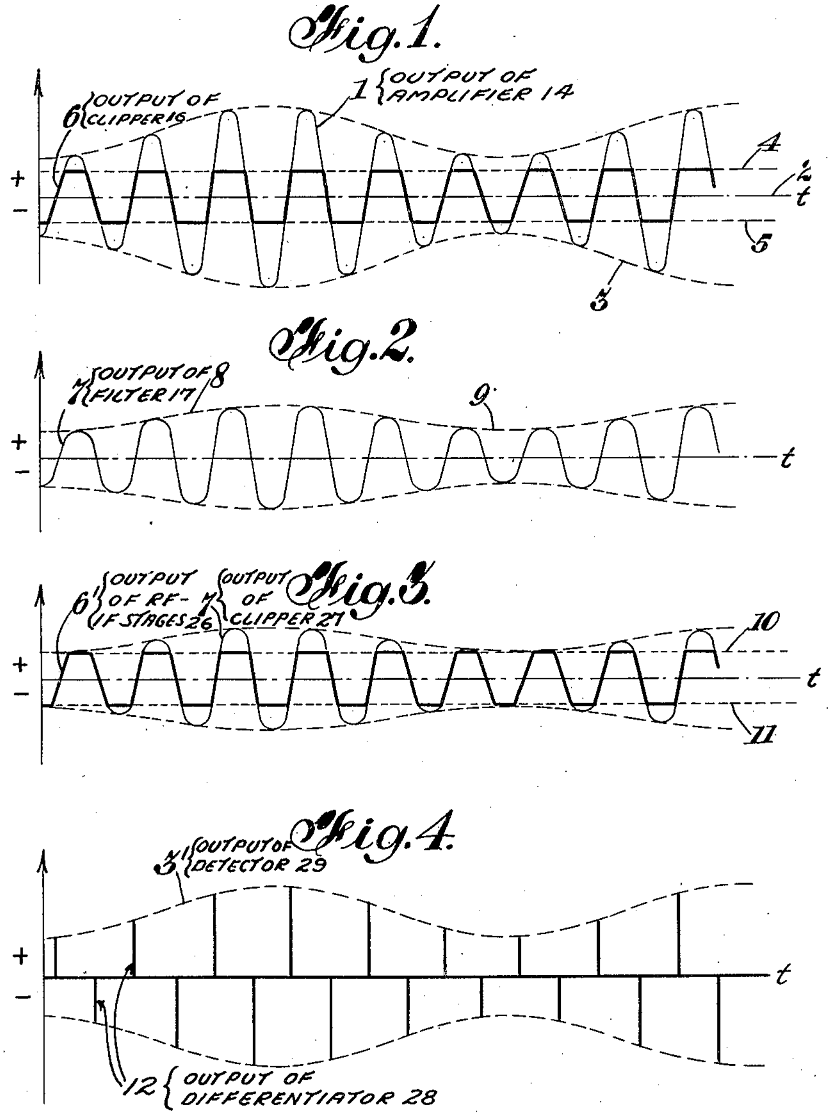
Fig. 1 illustrates the A. M. carrier and the square top wave formed therefrom.
Fig. 2 shows the transmitted C. M. wave.
Fig. 3 illustrates the clipping of the received signal.
Fig. 4 illustrates the signal after differentiation in the receiver.

The A. M. wave 1 formed about an axis 2 has an envelope 3 which does not dip to the axis, i. e., the carrier is less than 100% modulated. The A. M. wave may be clipped along lines 4 and 5 which may be anywhere within the narrowest part of the envelope 3. The resultant square-topped wave 6 is indicated in heavy lines. The modulation of the carrier is represented by the slope of the discrete pulses of which the wave 6 is made up.

The wave 6 is passed through a band pass filter to produce a C. M. wave 7 suitable for transmission within a much narrower frequency spectrum band that would be needed for wave 6. The difference between 6 and 7 is that the sharp corners are rounded thus eliminating the higher harmonics, and the amplitude swing of envelope 8 of the wave 7 is considerably less as indicated by the slight dip at 9. The extent to which the slopes of wave 6 are effected, i. e., greater degree of frequency modulation, and the envelope amplitude variations, i. e., greater degree of amplitude modulation, depends on the spectrum band that one wishes to occupy in transmission. The greater the variations of the slopes of C. M. wave 7 is and the flatter its envelope 8, the more space will be needed for the signal in the frequency spectrum. The envelope may be flattened and the corners rounded so as that C. M. wave 7 will have many times the signal-to-noise ratio of A. M. wave 1, occupy only several times as wide a band, and require no straight-line amplifiers.

In the receiver the wave 7 (Fig. 3) is clipped along lines 10, 11 which are within the narrowest part of the envelope 8. This will yield a square-topped wave 6' which is substantially like 6 and from which much of the parasitic noise has been eliminated.

After differentiation, a wave 12 (Fig. 4) is produced whose envelope 3' is substantially like the envelope 3 of the original A. M. wave 1.

While in Figs. 1 and 3 the lines 4, 5 and 10, 11 along which the wave is clipped are symmetrical with respect to the axis, it will be obvious to those skilled in the art that any other portion of the wave may be clipped out symmetrically or asymmetrically with respect to the axis.

Figure 5:
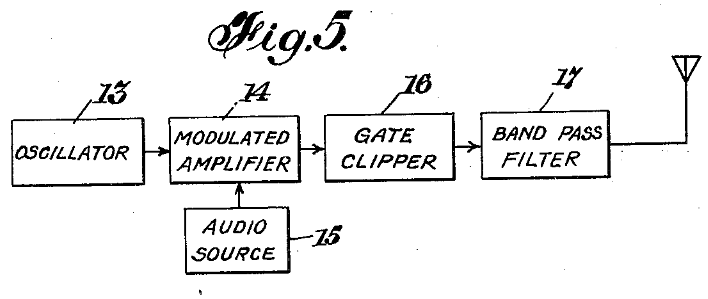
Figs. 5 and 6 are block diagrams of two transmitters.

Referring now to the transmitter illustrated in Fig. 5 a crystal-controlled oscillator or other type oscillator 13 is connected with an amplifier 14 which may be modulated from an audio source 15.

If a crystal-controlled oscillator may be used. a source of complications of F. M. transmitters is eliminated.

The output of the modulated amplifier 14 will be the amplitude modulated wave 1 (Fig. 1). This is fed to a known gate clipper 16, which may be a double limiter circuit, for example, which will clip the wave 1 along lines 4, 5 (Fig. 1) producing the wave 6. A band pass filter 17 through which wave 6 next passes removes the higher harmonics so as to transmit only the fundamental wave and its side bands.

The C. M. wave 7 may be transmitted over the air, wires or any other suitable medium.

The circuits of the amplifier 14, gate clipper 16 and the band pass filter 17 may be of any conventional types having two tubes and operating at low power levels.

Figure 6:
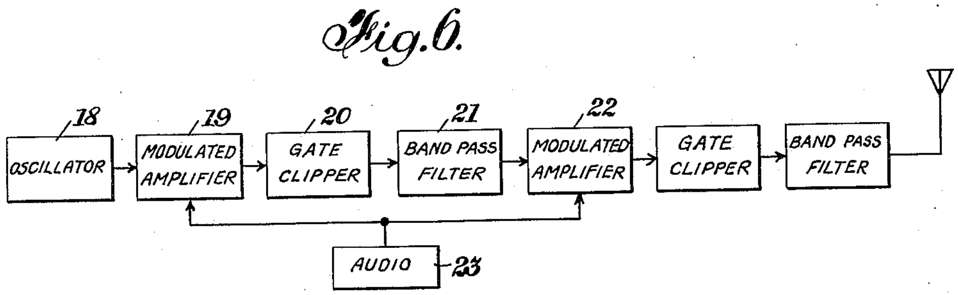

Many modifications of the transmitter, may be adopted. For instance, the clipping and filtering may be repeated in several stages as shown in Fig. 6 wherein a crystal-oscillator 18 drives a modulated amplifier 19 connected over a gate clipper 20 with a band pass filter 21. The filter 21 feeds into a second amplifier 22 which together with the amplifier 19, is modulated from an audio source 23 and to which the C. M. wave output of the band pass filter 21 is applied for a further modulation.

A second gate or double clipper 24 clips the output of modulator 22 and feeds it to a band pass filter 25 which removes the higher harmonics. The output of the band pass filter 25 may be further modulated by the signal as desired.

While any well-known type of F. M. receiver may be used for receiving signal 7, preferably the receiver comprises the elements of Fig. 7 in the manner such as disclosed in my co-pending application, Serial No. 483,366, filed, April 16, 1943, Patent No. 2,471,427 or the elements of Fig. 8.

Figure 7:
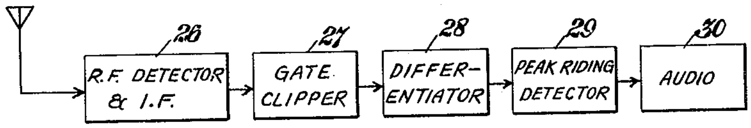
Figs. 7 and 8 are block diagrams of two receivers that may be used.

In Fig. 7 the signal 7 is passed through a radio frequency detector and intermediate frequency amplifier 26 to a double gate clipper 27 where the signal is clipped along lines 10 and 11 (Fig. 3). The wave 6' thus produced is differentiated at 28 which yields wave 12 (Fig. 4). A peak riding detector 29 conveys the A. M. signals to an audio reproducing system 30.

Figure 8:
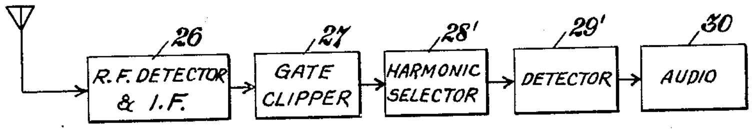

As in the transmitter, many modifications can be made in the receiver also. For instance, as shown in Fig. 8, the differentiator 28 and peak riding detector 29 are replaced by a harmonic selector 28' and a suitable detector 29'.

While I have shown and described my invention with reference to particular embodiments it will be clear to those skilled in the art that other embodiments and variations of those shown may be made without departing from my invention. It will be understood, therefore, that the present embodiments are given by way of example and not as a limitation on the scope of the invention.

I claim:

1. In a communication system, means for generating a carrier wave, means for modulating the amplitude of the carrier in accordance with the intelligence to be communicated, means for clipping the modulated carrier between two symmetrical levels above and below the carrier axis and passing only that portion of the wave intermediate the two levels, and means for removing harmonics from said clipped wave portion.

2. The communication system according to claim 1, and further comprising means for modulating in accordance with the intelligence to be communicated the output of the last mentioned means for removing harmonics, means for clipping out a portion of the wave produced by the last mentioned modulation, and means for removing harmonics from the last mentioned clipped wave portion.

3. In a communication system, means for generating a carrier wave, means for modulating the amplitude of the carrier in accordance with the intelligence to be communicated to an extent which will maintain the modulated wave envelope at all points above the axis of the carrier, means for clipping the carrier within the narrowest part of the envelope, and filter means for removing some of the higher harmonics from the clipped wave.

4. The communication system according to claim 3, and further comprising means for modulating in accordance with the intelligence to be communicated the output of the filter means to an extent which will maintain the modulated wave envelope at all points above the axis of the carrier, means for clipping the wave thus modulated within the narrowest part of its envelope, and a second filter means for removing additional higher harmonics for the clipped wave.

5. In a communication system, means including a crystal-controlled oscillator for generating a carrier wave, means for modulating the amplitude of the carrier in accordance with the intelligence to be communicated to an extent which will maintain the modulated wave envelope at all points above the axis of the carrier, means for clipping the modulated carrier between two symmetrical levels above and below its axis but within the narrowest part of the envelope and passing only that portion of the wave intermediate the two levels, a band pass filter for removing from the clipped waves all harmonics except those adjacent the fundamental, and means for transmitting the last-mentioned waves.

6. The method of communication comprising the following steps: generating a carrier wave energy, amplitude modulating the carrier in accordance with the signals, clipping the modulated carrier between two symmetrical levels above and below the carrier axis and passing only that portion of the carrier intermediate the two levels, filtering said portion to remove some of the higher harmonics, and transmitting the carrier with the remaining harmonics.

7. The method according to claim 6, and in which the filtering is performed in a plurality of successive steps.

8. The method of communication comprising the following steps: generating a carrier, amplitude modulating the carrier in wave energy in accordance with the signals, clipping the modulated carrier between two symmetrical levels above and below the carrier axis adjacent said axis, and passing only that portion of the wave intermediate the two levels, filtering said portion to remove all the higher harmonics, and transmitting the carrier with the harmonics adjacent the fundamental.

9. The method according to claim 8, and in which the filtering is performed in a plurality of steps.

DONALD D. GRIEG.

REFERENCES CITED

The following references are of record in the file of this patent:

UNITED STATES PATENTS

| Number | Name | Date |
|---|---|---|
| 1,564,627 | Round | Dec. 8, 1925 |
| 1,673,002 | Fearing | June 12, 1928 |
| 1,678,163 | Peterson | July 24, 1928 |
| 1,699,570 | Potter | Jan. 22, 1929 |
| 1,712,993 | Heising | May 14, 1929 |
| 2,086,601 | Caruthers | July 13, 1937 |
| 2,285,044 | Morris | June 2, 1942 |
| 2,338,412 | Dallos | Jan. 4, 1944 |
| 2,340,429 | Rankin | Feb. 1, 1944 |
| 2,419,547 | Grieg | Apr. 29, 1947 |

FOREIGN PATENTS

| Number | Country | Date |
|---|---|---|
| 118,552 | Australia | June 8, 1944 |